United States Patent
Shinoda et al.

(10) Patent No.: US 8,491,978 B2
(45) Date of Patent: Jul. 23, 2013

(54) MULTILAYER ARTICLE

(75) Inventors: Atsuhiro Shinoda, Isehara (JP); Hiroshi Kumagai, Yamato (JP)

(73) Assignee: Nissan Motor Co., Ltd., Kanagawa (JP)

( * ) Notice: Subject to any disclaimer, the term of this patent is extended or adjusted under 35 U.S.C. 154(b) by 426 days.

(21) Appl. No.: 12/326,610

(22) Filed: Dec. 2, 2008

(65) Prior Publication Data
US 2009/0169787 A1    Jul. 2, 2009

(30) Foreign Application Priority Data
Dec. 27, 2007    (JP) ................. 2007-337152

(51) Int. Cl.
| | | |
|---|---|---|
| *B32B 1/00* | (2006.01) | |
| *B32B 1/02* | (2006.01) | |
| *B32B 1/08* | (2006.01) | |
| *B32B 27/00* | (2006.01) | |
| *B32B 27/08* | (2006.01) | |
| *B32B 27/34* | (2006.01) | |

(52) U.S. Cl.
USPC ....... 428/35.7; 428/36.6; 428/36.7; 428/36.8; 428/36.91; 428/474.4; 428/475.5; 428/475.8; 428/476.1

(58) Field of Classification Search
USPC .................. 428/34.1, 35.7, 35.8, 35.9, 36.1, 428/36.2, 36.4, 36.6, 36.7, 36.8, 36.9, 36.91, 428/474.4, 475.5, 475.8, 476.1
See application file for complete search history.

(56) References Cited

U.S. PATENT DOCUMENTS

| | | | | |
|---|---|---|---|---|
| 4,167,538 A * | 9/1979 | Taniguchi et al. | ............ | 525/438 |
| 5,217,669 A * | 6/1993 | Dublinski et al. | ............ | 264/258 |
| 5,937,911 A * | 8/1999 | Kodama et al. | ............... | 138/137 |
| 6,773,755 B2 | 8/2004 | Fukushi et al. | | |
| 6,805,168 B2 * | 10/2004 | Van Hooren | .................. | 138/137 |

FOREIGN PATENT DOCUMENTS

| | | |
|---|---|---|
| EP | 1 925 636 B1 | 9/2011 |
| JP | 2002-210892 | 7/2002 |
| JP | 2004-506548 A | 3/2004 |
| JP | 2007-77317 | 3/2007 |
| WO | WO 00/06376 A1 | 2/2000 |

OTHER PUBLICATIONS

Definitions of "rubber", "curing" and "cross-linking", Hawley's Condensed Chemical Dictionary, 14th Edition, John Wiley & Sons, Inc., 2002.*
Machine translation of JP 05-008353 A, Jan. 1993 (Ito).*
JIS K 6256-1, "Rubber, vulcanized or thermoplastic—Determination of adhesion test—Part 1: Adhesion to textile fabric", 2006.
JIS K 6256-2, "Rubber, vulcanized or thermoplastic—Determination of adhesion test—Part 2: Adhesion to a rigid substrate—90° peel method", 2006.
JIS K 6256-3, "Rubber, vulcanized or thermoplastic—Determination of adhesion test—Part 3: Adhesion to metal-Two-plate method", 2006.

* cited by examiner

*Primary Examiner* — Walter B Aughenbaugh
(74) *Attorney, Agent, or Firm* — Foley & Lardner LLP

(57) ABSTRACT

There is provided a multilayer article suitable for use as a fuel hose in an automotive fuel system and the like, which has an inner rubber layer, an outer rubber layer and an inter-mediate resin layer formed of polyamine-based resin between the inner and outer rubber layers.

7 Claims, 1 Drawing Sheet

1A  1B  1C 2A  2B  2C  2D

MULTILAYER ARTICLE

BACKGROUND OF THE INVENTION

The present invention relates to a multilayer article, particularly of the type having high fuel permeation resistance even against alcohol-blended fuel and good interlayer adhesion for suitable use in an automotive fuel system and the like.

The regulations of evaporative hydrocarbon emissions from automotive fuel systems are becoming strict in various countries, notably the United States. A variety of fuel system parts such as fuel hoses have been developed in response to such strict evaporative emission regulations. In particular, multilayer rubber hoses are commonly proposed to attain connection-pipe sealing, fuel permeation resistance and flexibility etc. For example, one proposed rubber hose has a three-layer structure with an inner layer of fluororubber (FKM) or acrylonitrilebutadiene rubber (NBR), an intermediate layer of tetrafluoroethylene-hexafluoropropylene-vinylidene fluoride terpolymer resin (THV) as a fuel barrier layer and an outer layer of epichlorohydrin rubber (ECO) or acrylonitrilebutadiene rubber (NBR). Another proposed rubber hose has a four-layer structure with an inner layer of FKM, an intermediate layer of THV, an outer layer of ECO and another outer covering layer of chlorosulfonated polyethylene (CSM) or chlorinated polyethylene (CPE). See Published Japanese Translation of PCT Application No. 2004-506548.

SUMMARY OF THE INVENTION

In the above-proposed multilayer rubber hoses, the fuel barrier layers are formed of fluoropolymers. With the increasing use of alcohol-blended fuel e.g. ethanol-blended fuel in response to the recent environmental changes, there is a tendency to increase the thickness of the fuel barrier layer so that the fuel barrier layer can secure sufficient fuel barrier properties against the alcohol-blended fuel. However, the flexibility and workability of the multilayer rubber hose decreases with increase in the thickness of the fluoropolymer fuel barrier layer. It is desired that the multilayer rubber hose ensures compatibility between flexibility, workability and fuel barrier layer thickness. As for the material design of the multilayer rubber hose, it is common to apply an adhesive layer between the fluoropolymer fuel barrier layer and the inner/outer rubber layer, apply a primer coat or blend an adhesion promoter in the inner/outer rubber layer so that the fluoropolymer fuel barrier layer can be adhered securely to the inner/outer rubber layer. This however raises a problem that the remaining unreacted adhesive component gets extracted (eluted) from the hose into the fuel and affects component parts around the hose.

It is therefore an object of the present invention to provide a multilayer article of the type having improved fuel barrier properties such as fuel permeation resistance even against alcohol-blended fuel, good interlayer adhesion between inner rubber layer and intermediate resin layer (fuel barrier layer) and high resistance to extraction of adhesive component by fuel for use as a fuel hose in an automotive fuel system and the like.

As a result of extensive researches, it has been found that a multilayer laminated structure having an intermediate layer of polyamide-based resin as a fuel barrier layer between inner and outer rubber layers provides improved fuel barrier properties, good interlayer adhesion and high adhesive component extraction resistance. The present invention is based on such a finding.

According an aspect of the present invention, there is provided a multilayer article comprising an inner rubber layer; an outer rubber layer; and an intermediate resin layer formed of polyamide-based resin between the inner and outer rubber layers.

The other objects and features of the present invention will also become understood from the following description.

DESCRIPTION OF THE EMBODIMENTS

The present invention will be described below with reference to the drawings.

A multilayer article according to the present invention has a laminated structure of at least three layers: an inner rubber layer, an outer rubber layer located around the inner rubber layer and an intermediate resin layer interposed between the inner and outer rubber layers. It is possible to modify the laminated structure of the multilayer article by providing an additional layer(s) between the intermediate resin layer and the outer rubber layer as another intermediate (intervenient) layer or on the outer side of the outer rubber layer as another outer covering layer depending on the performance required of the multilayer article.

Figure 1:
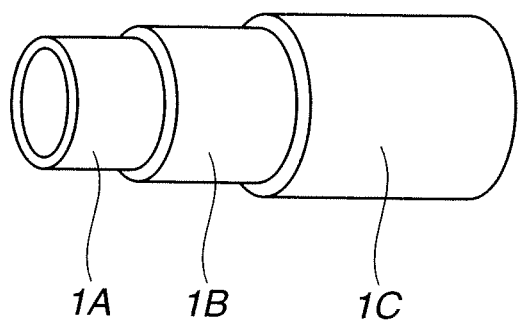
FIG. 1 is a perspective view of a multilayer hose according to one exemplary embodiment of the present invention.
Figure 2:
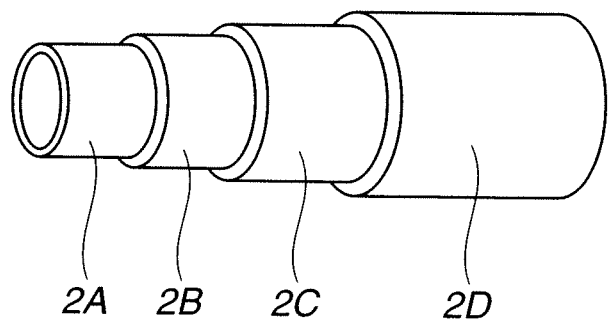
FIG. 2 is a perspective view of a multilayer hose according to another exemplary embodiment of the present invention.

According to one embodiment of the present invention, the multilayer article can be formed into a tubular shape as a multilayer hose with a three-layer structure of an inter rubber layer 1A, an intermediate resin layer 1B and an outer rubber layer 1C as shown in FIG. 1. As shown in FIG. 2, the multilayer article can alternatively be formed as a multilayer hose with a four-layer structure of an inter rubber layer 2A, an intermediate resin layer 2B, another intermediate (intervenient) layer 2C and an outer rubber layer 2D according to another embodiment of the present invention.

The intermediate resin layer 1B, 2B is formed of a polyamide (PA)-based resin. The PA-based resin is herein defined as a resin predominantly comprising or consisting of PA, and more specifically, a resin containing 70 mass % or more of PA based on the total mass of the resin. Preferred examples of the polyamide are polyamide compounds such as polyamide 9T (PA9T), polyamide 6T (PA6T), polyamide 6 (PA6), polyamide 66 (PA66), polyamide 610 (PA610), polyamide 612 (PA612) and polyamide 46 (PA46) and copolymers of at least any one thereof. It is noted that the copolymers are not limited to bipolymers and refer to not only bipolymer but also terpolymers and other multipolymers. As the polyamide has good fuel barrier properties such as fuel permeation resistance even against alcohol-blended fuel and exhibits good adhesion to rubber material, the intermediate resin layer 1B, 2B properly and effectively functions as a fuel barrier layer between the inner rubber layer 1A, 2A and the outer rubber layer 1C, 2D.

The inner rubber layer 1A, 2A is preferably formed of fluororubber. Preferred examples of the fluororubber are binary fluororubber such as vinylidene fluoride-hexafluoropropylene copolymer rubber and ternary fluororubber such as vinylidene fluoride-hexafluoropropylene-tetrafluoroethylene terpolymer rubber and tetrafluoroethylene-propylene-vinylidene fluoride terpolymer rubber.

It is further preferable that the inner rubber layer 1A, 2A and the intermediate resin layer 1B, 2B are directly laminated and adhered to each other in such a manner that the inner rubber layer 1A, 2A has an outer surface held in direct contact with an inner surface of the intermediate resin layer 1B, 2B with no additional layer interposed between the inner rubber layer 1A, 2A and the intermediate resin layer 1B, 2B.

The direct lamination of the intermediate resin layer 1B, 2B onto the inner rubber layer 1A, 2A enables vulcanization bonding of the PA-based resin and the rubber concurrently with crosslinking of the rubber, thereby forming strong adhesion between the inner rubber layer 1A, 2A and the intermediate resin layer 1B, 2B. With such good interlayer adhesion, it is possible for the multilayer hose to secure good fuel barrier properties such as fuel permeation resistance against the alcohol-blended fuel. Further, the vulcanization bonding of the inner rubber layer 1A, 2A and the intermediate resin layer 1B, 2B eliminates the need to blend an adhesion promoter in the inner rubber layer 1A, 2A, apply an adhesive to the intermediate resin layer 1B, 2B or perform primer coat treatment and thereby prevent or reduce the extraction of the adhesive component (adhesive, adhesion promoter, primer coat) into the fuel as compared to the prior art products in which the intermediate layer is formed of fluoropolymer. It is also possible to decrease the overall thickness of the multilayer hose and improve the workability of the multilayer hose by the formation of no additional layer between the inner rubber layer 1A, 2A and the intermediate resin layer 1B, 2B.

The outer rubber layer 1C, 2D is preferably formed of at least one rubber selected from the group consisting of epichlorhydrin rubber (ECO), acrylonitrile-butadiene rubber (NBR), acrylic rubber (ACM), ethylene-acrylic rubber (AEM), chlorosulfonated polyethylene (CSM), chlorinated polyethylene (CPE), chloroprene rubber (CR), ethylene-propylene rubber (EPM) and ethylene-propylene-diene rubber (EPDM).

For higher resistance to extraction of the adhesive component by fuel, it is particularly preferable that the multilayer hose contains a hexane-insoluble fraction of 0.1 mg/cm$^2$ or less, in terms of mass per inner surface area of the multilayer hose, as extracted with a mixed solvent of 45 vol % isooctane, 45 vol % toluene and 10 vol % ethanol by charging the mixed solvent in the multilayer hose at 40° C. for 168 hours (1 week).

The above-structured multilayer hose can be formed by tandem molding (multilayer molding) of the rubber and the PA-based resin or spinning of the PA-based resin on the rubber, followed by subjecting the resulting rubber-resin laminate to vulcanization under given pressure/temperature conditions so as to form vulcanization bonding of the PA-based resin and the rubber concurrently with cross-inking of the unvulcanized rubber. The vulcanization may be performed in a plurality of steps as will be explained later.

As described above, the multilayer article of the present invention shows good fuel barrier properties even against the alcohol-blended fuel and thus can be suitably used in an automotive fuel system. The multilayer article of the present invention also shows good fuel barrier properties against other fuels and can be suitably applied to any hollow shaped articles such as a container, feed pipe or storage tank for various fluids e.g. gasoline, diesel fuel, alcohol, LP gas, natural gas, hydrogen and any mixture thereof.

The present invention will be described below in more detail with reference to the following examples. It should be however noted that the following examples are only illustrative and not intended to limit the invention thereto.

SAMPLE PREPARATIONS

Example 1

A three-layer hose was formed with an inner layer (1A) of vinylidene fluoride-hexafluoropropylene-tetrafluoroethylene terpolymer rubber (vulcanization agent: peroxide), an intermediate resin layer (1B) of PA9T and an outer layer (1C) of ECO (vulcanization agent: thiourea) as shown in FIG. 1, by extruding the vinylidene fluoride-exafluoropropylene-tetrafluoroethylene terpolymer rubber, PA9T and ECO into a tubular shape with an extruder and subjecting the resulting tubular laminate to primary vulcanization at 150° C. for 30 minutes and then to secondary vulcanization at 160° C. for 90 minutes. No adhesive was applied between the inner rubber layer (1A) and the intermediate resin layer (1B) and between the intermediate resin layer (1B) and the outer rubber layer (1C). The thus-obtained hose had an outer diameter of 32.4 mm, an inner diameter of 24.4 mm and a length of 300 mm. Further, the inner rubber layer (1A), the intermediate resin layer (1B) and the outer rubber layer (1C) were 0.5 mm, 0.1 mm and 3.4 mm in thickness, respectively.

Example 2

A three-layer hose was formed in the same manner as in Example 1, except that the inner rubber layer (1A) was formed of vinylidene fluoride-hexafluoropropylene copolymer rubber (vulcanization agent: peroxide) and the intermediate resin layer (1B) was formed of PA6T.

Example 3

A three-layer hose was formed in the same manner as in Example 1, except that the inner rubber layer (1A) was formed of vinylidene fluoride-hexafluoropropylene copolymer rubber (vulcanization agent: peroxide) and the intermediate resin layer (1B) was formed of PA9T.

Example 4

A three-layer hose was formed in the same manner as in Example 1, except that the inner rubber layer (1A) was formed of vinylidene fluoride-hexafluoropropylene-tetrafluoroethylene terpolymer rubber (vulcanization agent: polyol).

Example 5

A three-layer hose was formed in the same manner as in Example 1, except that the inner rubber layer (1A) was formed of tetrafluoroethylene-propylene-vinylidene fluoride terpolymer rubber (vulcanization agent: polyol).

Example 6

A three-layer hose was formed in the same manner as in Example 1, except that the intermediate resin layer (1B) was formed of PA66.

Comparative Example 1

A three-layer hose was formed in the same manner as in Example 1, except that the inner rubber layer (1A) was formed of vinylidene fluoride-hexafluoropropylene-tetrafluoroethylene terpolymer rubber with 1,8-diazabicyclo[5.4.0]undecen and the intermediate resin layer (1B) was formed of tetrafluoroethylene-hexafluoropropylene-vinylidene fluoride terpolymer resin (THV).

Comparative Example 2

A four-layer hose was formed with an inner layer (2A) of NBR (vulcanization agent: sulfur) with 1,5-diazabicyclo[4.3.0]nonene, an intermediate resin layer (2B) of THV, another intermediate layer (2C) of NBR (vulcanization agent: sulfur) with 1,5-diazabicyclo[4.3.0]nonene and an outer layer (2D) of CSM. The thus-obtained hose had an outer diameter of 32.4 mm, an inner diameter of 24.4 mm and a length of 300 mm. Further, the inner rubber layer (2A), the intermediate resin layer (2B), the intermediate rubber layer (2C) and the outer rubber layer (2D) were 1.5 mm, 0.1 mm, 1.9 mm and 0.5 mm in thickness, respectively.

PERFORMANCE EVALUATIONS

Each of the multilayer hoses was tested for fuel permeation resistance, interlayer adhesion and extraction resistance by the following procedures.
(Fuel Permeation Resistance)
A fuel composition of commercial regular gasoline (90 vol %) and ethanol (10 vol %) was charged into a stainless-steel test vessel. One end of the multilayer hose was fixed to the test vessel with a clamp. A stainless-steel sealing stopper was put on the test vessel with the other end of the multilayer hose fixed to the sealing stopper by a clamp. In this state, the multilayer hose was left in the fuel composition at 40° C. for 20 weeks. After that, the fuel permeation amount of the multilayer hose was measured by SHED (Sealed Housing For Evaporative Determination) under CARB (California Air Resources Board)-designated conditions. The fuel permeation resistance was rated as "A" when the fuel permeation amount was less than 1/10 of that of Comparative Example 1, "B+" when the fuel permeation amount was less than 1/5 of that of Comparative Example 1 and "B" when the fuel permeation resistance was equivalent to that of Comparative Example 1.
(Interlayer Adhesion)
A fuel composition of commercial regular gasoline (90 vol %) and ethanol (10 vol %) was charged into the multilayer hose. After the multilayer hose was left at 60° C. for 168 hours in this state, the fuel composition was removed from the multilayer hose. The multilayer hose was then left at room temperature for 10 minutes and diecutted into a test piece of 10 mm in width and 200 mm in length. The thickness of the test piece was the same as that of the multilayer hose. A peel test was performed on the test piece by peeling the inner rubber layer and the intermediate resin layer slightly away from each other at a given point of the test piece, fixing the peeled parts to chucks in a test machine and activating the test machine under the conditions according to JIS K6256, thereby drawing a graph of tensile load curve. An average value of the tensile load curve was obtained as a peel load. The peel strength was determined by the following equation.

Peel strength (N/cm)=Peel load (N)/Test piece width (cm)

The interlayer adhesion was rated as "A" when the peel strength was higher than that of Comparative Example 1 and "B" when the peel strength was equivalent to that of Comparative Example 1.
(Extraction Resistance)
A fuel composition of isooctane (45 vol %), toluene (45 vol %) and ethanol (10 vol %) was charged in the multilayer hose at 40° C. for 168 hours, removed from the multilayer hose and then condensed by air drying. Hexane was added to the condensed fuel composition. The resulting fluid was stirred for 1 hour or more in an ultrasonic cleaner and left still for 24 hours. After that, the supernatant fluid was removed. The precipitate was vacuum-dried at 40° C. for 8 hours. The thus-obtained insoluble fraction was as "hexane-insoluble fraction" and converted to mass per inner surface area of the multilayer hose.

The evaluation results are summarized in TABLE.

TABLE

| | Structure | | | |
|---|---|---|---|---|
| Sample | Inner rubber layer | Intermediate resin layer | Intermediate rubber layer | Outer rubber layer |
| Example 1 | Ternary fluororubber (peroxide vulcanization) | PA9T | — | ECO |
| Example 2 | Binary fluororubber (peroxide vulcanization) | PA6T | — | ECO |
| Example 3 | Binary fluororubber (polyol vulcanization) | PA9T | — | ECO |
| Example 4 | Ternary fluororubber (polyol vulcanization) | PA9T | — | ECO |
| Example 5 | Ternary fluororubber (polyol vulcanization) | PA9T | — | ECO |
| Example 6 | Ternary fluororubber (polyol vulcanization) | PA66 | — | ECO |
| Comparative Example 1 | Ternary fluororubber | THV | — | ECO |
| Comparative Example 2 | NBR | THV | NBR | CSM |

| | Performance | | | |
|---|---|---|---|---|
| Sample | Fuel permeation resistance | Interlayer adhesion | Hexane insoluble fraction (mg/cm$^2$) | Total evaluation |
| Example 1 | A | A | 0.018 | A |
| Example 2 | A | A | 0.027 | A |
| Example 3 | A | A | 0.027 | A |
| Example 4 | A | A | 0.018 | A |
| Example 5 | A | A | 0.018 | A |
| Example 6 | A | A | 0.018 | A |
| Comparative Example 1 | B | B | 1.0 | B |
| Comparative Example 2 | B | A | 4.2 | B |

As is apparent from TABLE 1, the multilayer hoses of Examples 1 to 6 showed a less fuel permeation amount and thus had higher resistance to permeation by ethanol-blended fuel than those of Comparative Examples 1 and 2. The multilayer hoses of Examples 1 to 6 showed higher peel strength and thus had stronger adhesion between the inner rubber layer and the intermediate resin layer than that of Comparative Example 1. Further, the multilayer hoses of Examples 1 to 6 contained a less hexane-insoluble fraction and thus had higher resistance to adhesive component extraction by fuel than those of Comparative Examples 1 and 2. In other words, the multilayer hoses of Examples 1 to 6 were superior in performance to those of Comparative Examples 1 and 2.

In this way, it is accordingly possible in the present invention to provide the multilayer article with improved fuel barrier properties, good interlayer adhesion and high adhesive component extraction resistance by forming the intermediate layer of polyamide-based resin as a fuel barrier layer between the inner and outer rubber layers.

The entire contents of Japanese Patent Application No. 2007-337152 (filed on Dec. 27, 2007) are herein incorporated by reference.

Although the present invention has been described with reference to the above specific embodiments, the invention is not limited to these exemplary embodiments. Various modification and variation of the embodiments described above will occur to those skilled in the art in light of the above teachings. The scope of the invention is defined with reference to the following claims.

What is claimed is:

1. A multilayer article, comprising:
   an inner rubber layer;
   an outer rubber layer; and
   an intermediate resin layer formed of polyamide-based resin between the inner and outer rubber layers,
   wherein the polyamide-based resin of the intermediate resin layer consists essentially of at least one of polyamide 9T and polyamide 6T,
   wherein the rubber of the inner rubber layer is in contact with the polyamide-based resin of the intermediate resin layer, and
   wherein the rubber of the inner rubber layer is vulcanization bonded directly to the polyamide-based resin of the intermediate resin layer using a combination of a vulcanization agent and heat.

2. The multilayer article according to claim 1, wherein the inner rubber layer is formed of fluororubber.

3. The multilayer article according to claim 2, wherein the fluororubber is either vinylidene fluoride-hexafluoropropylene copolymer rubber, vinylidene fluoride-hexafluoropropylene-tetrafluoroethylene terpolymer rubber or tetrafluoroethylene-propylene-vinylidene fluoride terpolymer rubber.

4. The multilayer article according to claim 1, wherein the multilayer article contains a hexane-insoluble fraction of 0.1 mg/cm$^2$ or less, in terms of mass per inner surface area of the multilayer article, as extracted with a mixed solvent of 45% by volume isooctane, 45% by volume toluene and 10% by volume ethanol by charging the mixed solvent in the multilayer article at 40° C. for 168 hours.

5. The multilayer article according to claim 1, wherein the outer rubber layer is formed of at least one rubber selected from the group consisting of epichlorhydrin rubber, acrylonitrile-butadiene rubber, acrylic rubber, ethylene-acrylic rubber, chlorosulfonated polyethylene, chlorinated polyethylene, chloroprene rubber, ethylene-propylene rubber and ethylene-propylene-diene rubber.

6. The multilayer article according to claim 1, wherein the multilayer article is in the form of a hose.

7. The multilayer article according to claim 1, wherein the polyamide-based resin of the intermediate layer is either polyamide 9T or polyamide 6T.

* * * * *